United States Patent

Sato et al.

Patent Number: 6,039,631
Date of Patent: Mar. 21, 2000

[54] POLISHING METHOD, ABRASIVE MATERIAL, AND POLISHING APPARATUS

[75] Inventors: Shuzo Sato, Kanagawa; Hiizu Ohtorii, Tokyo, both of Japan

[73] Assignee: Sony Corporation, Tokyo, Japan

[21] Appl. No.: 09/065,444

[22] Filed: Apr. 24, 1998

[30] Foreign Application Priority Data

Apr. 28, 1997 [JP] Japan ................................. 9-110789

[51] Int. Cl.⁷ .............................. B24B 1/00; B24B 7/00; B24B 33/00
[52] U.S. Cl. .................... 451/37; 451/41; 451/57; 451/65; 451/66; 451/158; 451/548; 51/295; 51/296; 51/298
[58] Field of Search ................... 451/37, 41, 57, 451/63, 65, 66, 158, 159, 160, 548, 550; 51/293, 295, 296, 298

[56] References Cited

U.S. PATENT DOCUMENTS

| | | | |
|---|---|---|---|
| 4,927,432 | 5/1990 | Budlinger et al. | 51/298 |
| 5,035,087 | 7/1991 | Nishiguchi et al. | 451/11 |
| 5,453,312 | 9/1995 | Hass et al. | 51/293 |
| 5,492,550 | 2/1996 | Krishman et al. | 51/298 |
| 5,503,592 | 4/1996 | Neumann | 451/57 |
| 5,549,961 | 8/1996 | Hass et al. | 51/295 |
| 5,573,447 | 11/1996 | Kozakai et al. | 451/41 |

*Primary Examiner*—M. Rachuba
*Attorney, Agent, or Firm*—Hill & Simpson

[57] ABSTRACT

Disclosed is a polishing method including the step of: polishing a surface of a member to be polished by rotating and sliding an abrasive wheel holding fixed abrasive grains on the surface of the wheel while supplying free abrasive grains to the surface of the member to be polished; wherein the abrasive wheel is formed by binding the fixed abrasive grains with a soft binder and a pore forming agent. This polishing method is effective to obtain a high flatness of a polished surface and improve surface characteristics of the polished surface, and also to obtain a high continuous-workability by stably keeping a polishing ability for a long period of time.

9 Claims, 3 Drawing Sheets

POLISHING METHOD, ABRASIVE MATERIAL, AND POLISHING APPARATUS

BACKGROUND OF THE INVENTION

The present invention relates to a polishing method, an abrasive material, and a polishing apparatus, and particularly to a polishing method for polishing a surface of a member to be polished using an abrasive wheel holding fixed abrasive grains while supplying free abrasive grains to the surface of the member to be polished, an abrasive material used for the polishing method, and a polishing apparatus used for the polishing method.

A process of fabricating semiconductor devices includes a step of planarizing a wafer surface by lapping or polishing. For example, as shown in FIG. 1A, an interconnection pattern 2 made from aluminum is formed on a semiconductor wafer 1 made from silicon or the like, being covered with an insulating film 3 made from $SiO_2$ or the like, and before formation of a multi-layered interconnection, the insulating film 3 is planarized for improving an accuracy and a coverage of the upper layer pattern.

In such a planarizing step, there has been adopted a polishing method using free abrasive grains. This method is characterized by polishing a wafer surface with an abrasive cloth (pad) while supplying a polishing solution (slurry) mixed with free abrasive grains. Such a polishing method using free abrasive grains, however, fails to obtain a sufficient flatness, more specifically, allows steps to remain on the surface as shown in FIG. 1B. The reason for this is as follows: namely, the pad must be made soft somewhat for uniformly polishing the entire wafer surface and enhancing the quality of a polished surface, and accordingly, such a soft pad is elastically deformed along steps of the wafer surface during polishing, thus failing to sufficiently remove the steps of the wafer surface.

For applications other than the above-described process of fabricating semiconductor devices, there has been adopted a polishing method using fixed abrasive grains separately from the above-described polishing method using free abrasive grains. This method is characterized by using an abrasive wheel in which abrasive grains are fixed with a binder, wherein polishing is performed by bringing the rotating abrasive wheel in press-contact with a surface of a member to be polished, and sliding such an abrasive wheel on the surface of the member to be polished. The abrasive wheel is composed of a binder; abrasive grains (fixed abrasive grains) which are fixed with the binder and which contribute to polishing; and spaces (pores) for temporarily holding slipped-off abrasive grains and/or chips, thereby treating the slipped-off abrasive grains in such a manner as not to be in contact with the surface to be polished and preventing occurrence of scratches on the surface to be polished. In the polishing method using fixed abrasive grains, a sufficient flatness can be obtained because of a large grinding characteristic of the method; however, the polishing tool having a high hardness may give rise to a large number of scratches on the surface to be polished. This results in degradation of surface characteristics (micro-scratch, metal contamination, and other surface state due to foreign matters). Another disadvantage is that since pores of the abrasive wheel are blocked by accumulation of fine abrasive grains slipped off and/or chips during polishing, the processing efficiency is lowered, and in order to eliminate the lowering of the processing efficiency, maintenance must be frequently performed for removing blocking of the pores of the abrasive wheel and setting the pores thereof.

SUMMARY OF THE INVENTION

An object of the present invention is to provide a polishing method capable of obtaining a high flatness of a surface to be polish ed and improving surface characteristics of the polished surface, and further obtaining a high continuous-workability by stably keeping a polishing ability for a long period of time, an abrasive material used for the polishing method, and a polishing apparatus used for the polishing method.

To achieve the above object, according to the present invention, there is provided a polishing method including the step of: polishing a surface of a member to be polished by rotating and sliding an abrasive wheel holding fixed abrasive grains on the surface of the wheel while supplying free abrasive grains to the surface to be polished; wherein the abrasive wheel is formed by binding the fixed abrasive grains with a soft binder and a pore forming agent.

With this configuration, it is possible to perform polishing in which an advantageous function and effect of polishing by fixed abrasive grains is combined with an advantageous function and effect of polishing by free abrasive grains. To be more specific, a high flatness of a polished surface can be obtained by polishing using fixed abrasive grains and also occurrence of scratches on the polished surface can be suppressed, that is, surface characteristics of the polished surface can be improved by polishing using free abrasive grains. Further, polishing by fixed abrasive grains allows a high polishing ability, leading to the improved polishing efficiency. The high transfer characteristic inherent to polishing by fixed abrasive grains makes it possible to enhance a mechanism accuracy and a control accuracy on the polishing apparatus side, and hence to achieve surface polishing for at a high quality and a high accuracy.

Further, since free abrasive grains supplied to a member to be polished are rolled between an abrasive wheel and the member to be polished, these free abrasive grains allow the wasted fixed abrasive grains to be slipped off from a binder and hence to eliminate blocking of pores of the abrasive wheel. In this case, the use of a soft binder is effective to easily perform the slip-off of abrasive grains. In addition, since free abrasive grains sequentially supplied are held in the portions from which abrasive grains are slipped off or in the other pores, a state in which the polishing ability is high can be usually kept, to thereby continue high efficient polishing for a long period of time.

DESCRIPTION OF THE PREFERRED EMBODIMENTS

An abrasive wheel of the present invention is formed by binding fixed abrasive grains with a soft binder and a pore forming agent.

In a preferred embodiment, as the above soft binders, there may be used a melamine resin, urethane resin, or phenol resin.

With this configuration, since the abrasive wheel holding the fixed abrasive grains is softened, the abrasive wheel absorbs a polishing pressure somewhat, to reduce occurrence of scratches on the polished surface, thereby enhancing surface characteristics, and also the abrasive wheel allows the waste fixed abrasive grains to be easily slipped off therefrom, to keep the polishing ability of the abrasive wheel.

In another preferred embodiment, a ratio of an average particle size of the free abrasive grains to an average particle size of the fixed abrasive grains is in a range of about 1/6 to 1/3.

With this configuration, since the projecting amount of the fixed abrasive grains held by the binder is usually in a range of 1/6 to 1/3 of the particle size, the free abrasive grains in an amount corresponding to the projecting amount are usually supplied to the abrasive wheel. As a result, it is possible to stably continue a substantially constant polishing function.

As described above, the present invention can be applied to CMP (Chemical-Mechanical Polishing) used for planarization of a wafer in a fabrication process for semiconductor devices, and to surface processing for a glass substrate or an aluminum substrate used for forming a master disk of CDs, DVDs, laser disks or the like. As will be described later, the present invention can be also applied to high accurate curved surface processing for optical lenses, metal molds, or the like.

Figure 1A:
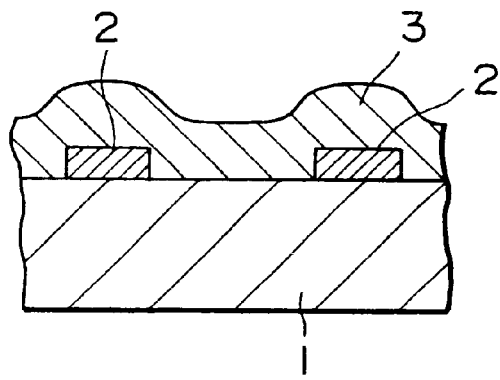
FIGS. 1A and 1B are views illustrating a process of planarizing a semiconductor wafer.
Figure 1B:
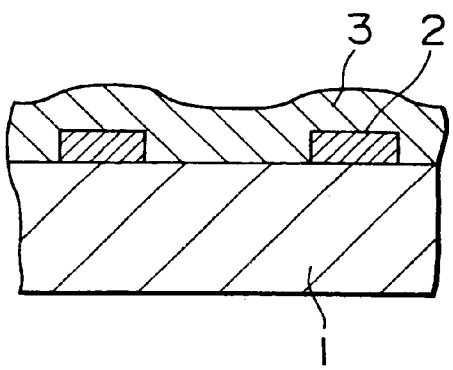
Figure 2:
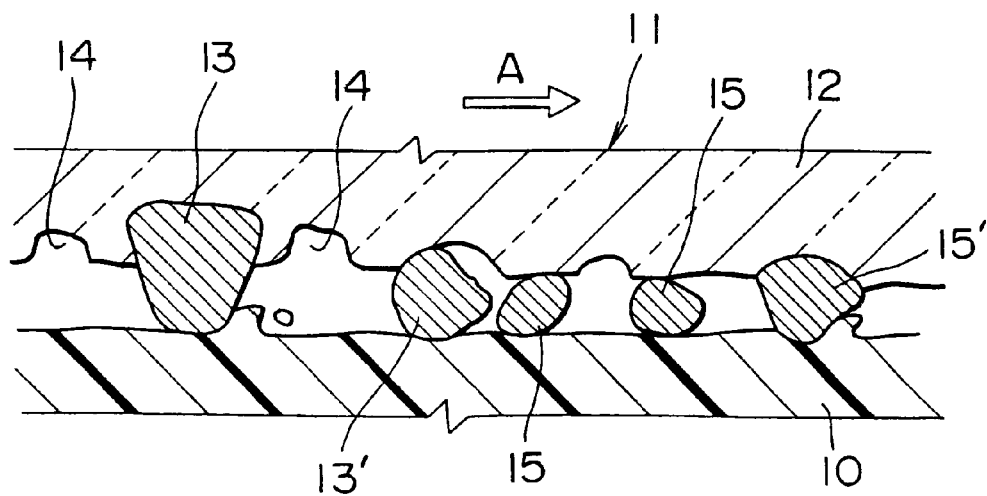
FIG. 2 is a view illustrating a function of an embodiment of the present invention.

FIG. 2 is a view illustrating a polished portion in a state of carrying out the polishing method of the present invention. An abrasive wheel 11 is pressed onto a surface of a member 10 to be polished such as a semiconductor wafer at a specific pressure while being rotated and moved in the direction indicated by an arrow A. The abrasive wheel 11 holds fixed abrasive grains 13 which are fixed with a soft binder 12. A large number of pores 14 formed in a surface portion of the soft binder 12 function to hold free abrasive grains supplied as a slurry on the surface of the soft binder 12. This is effective to improve the polishing ability and enhance the polishing efficiency, and also to improve surface characteristics by temporarily holding slipped-off fixed abrasive grains and/or chips and thus preventing the surface to be polished from being brought in contact with the slipped-off fixed abrasive grains and chips.

Free abrasive grains 15 supplied on the surface of the member 10 to be polished are rolled on the surface of the member 10 by rotation of the abrasive wheel 11. Fixed abrasive grains 13' wasted by polishing collide with the free abrasive grains 15 to be thus slipped off from the surface of the abrasive wheel 11. In this case, since the fixed abrasive grains are relatively loosely bound and held by the soft binder 12, they are easily slipped off. Free abrasive grains 15' newly supplied are held in cavities formed by slip-off of the fixed abrasive grains or the pores 14. These free abrasive grains 15' contribute to polishing.

Figure 3A:
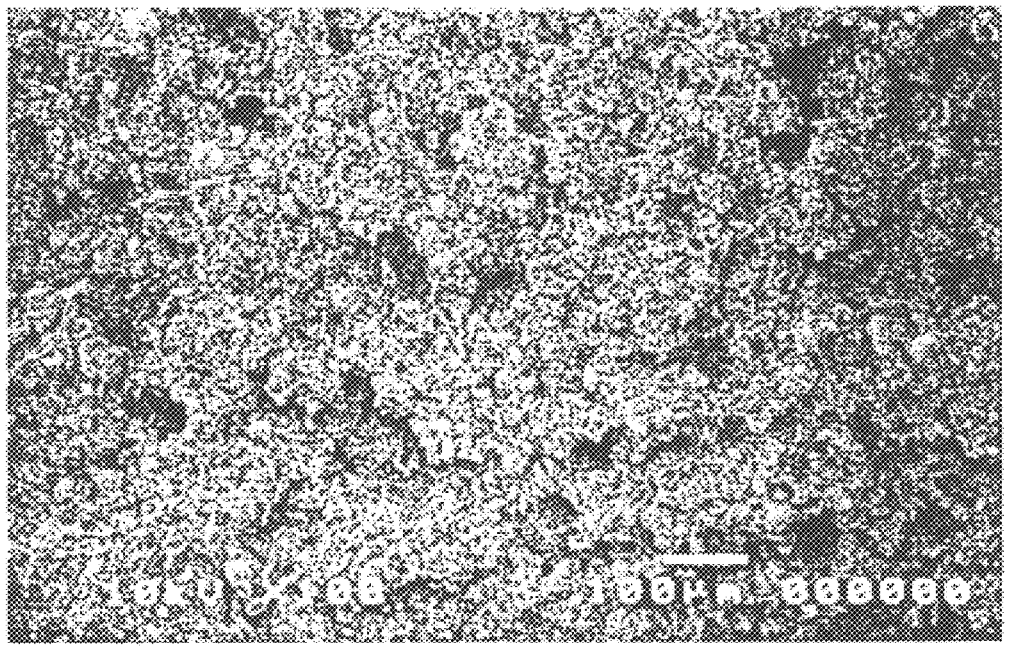
FIGS. 3A and 3B are microphotographs each showing a microstructure of a surface of an abrasive wheel of the present invention.
Figure 3B:
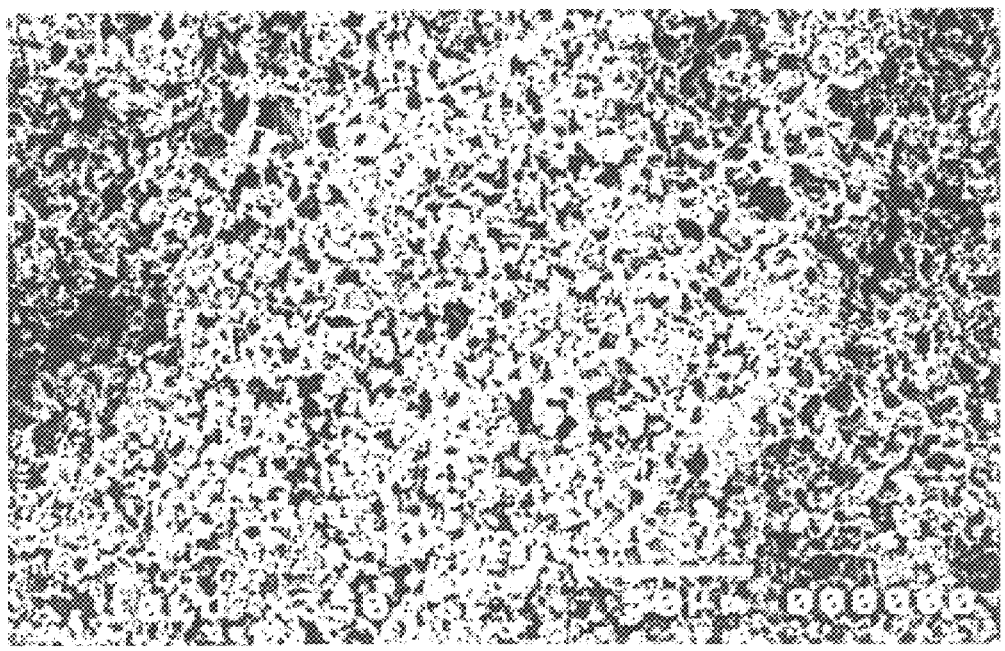

FIGS. 3A and 3B are microphotographs each showing a microstructure of the surface of the abrasive wheel 11 containing fixed abrasive grains of cerium oxide, wherein FIG. 3A shows the microstructure at a magnification of ×100, and FIG. 3B shows the microstructure at a magnification of ×350. In these microphotographs, a black portion indicates a pore, and a white portion indicates a projecting portion of an abrasive grain and a binder. Each microphotograph shows a state in which pore portions are clearly exposed, that is, not blocked. In the related art polishing using fixed abrasive grains, these pore portions are blocked for a short period of time; however, according to the present invention, blocking of the pores can be eliminated by the free abrasive grains newly supplied, to thereby keep the continuous-workability.

Figure 4:
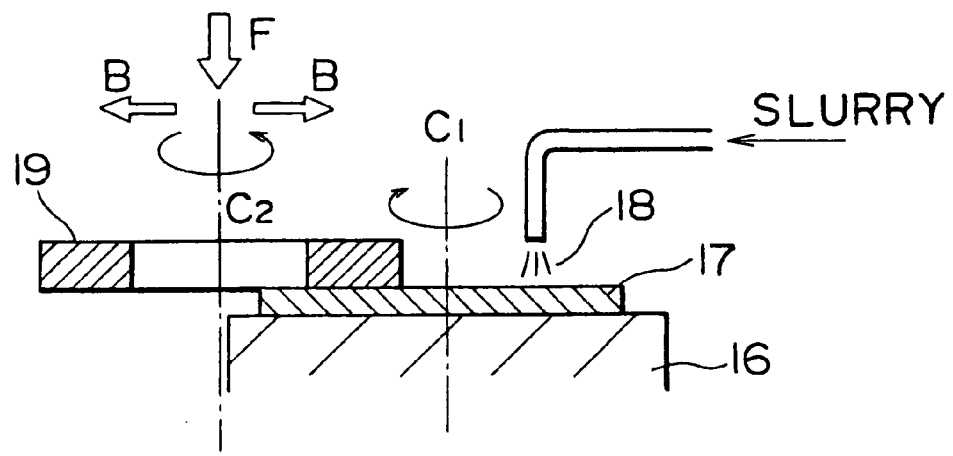
FIG. 4 is a view illustrating a configuration of one example of the embodiment of the present invention.

FIG. 4 shows a configuration of one example of the embodiment of the present invention. In this example, a semiconductor wafer 17 mounted on a rotating stage 16 is rotated around its axis C1, and a surface of the wafer 17 is polished by an abrasive wheel 19 rotated around its axis C2 while a polishing solution (slurry) 18 containing the above-described free abrasive grains is supplied to the surface of the wafer 17. The surface of the semiconductor wafer 17 is polished by the abrasive wheel 19 which is pressed on the surface of the wafer 17 at a specific pressing force F while being rotated and slid along the surface of the wafer 17 in the direction shown by an arrow B.

Specific examples of materials of fixed abrasive grains and free abrasive grains may include:

(1) oxides: for example, $Al_2O_3$ (Knoop hardness: 2,200), $SiO_2$ (Knoop hardness: 820), $CeO_2$ (Knoop hardness: 800), and $Fe_2O_3$, $CrO_2$, $MnO_2$, $ZnO_2$ (Knoop hardness: 1,800);

(2) carbides: for example, silicon carbide (Knoop hardness: 2,500), and boron carbide (Knoop hardness: 2,800);

(3) nitrides: for example, boron nitride having a cubic system (Knoop hardness: 4,700); and (4) natural or synthetic diamond (Knoop hardness: 7,000). In addition, the unit of the Knoop hardness is $Kgf/mm^2$.

Of these materials of abrasive grains, a suitable one may be selected in consideration of a material of a member to be polished, a polishing condition, and a compatibility with a member to be polished. With respect to the compatibility with a member to be polished, a hardness of a material of abrasive grains is preferably slightly lower than that of a member to be polished. For example, to polish a member made from $SiO_2$, there may be preferably used abrasive grains of $CeO_2$, and to polish a member of Si, there may be preferably used abrasive grains of $ZnO_2$.

The abrasive wheel is formed by binding the above-described fixed abrasive grains relatively loosely as compared with the usual abrasive wheel, with a soft binder such as a melamine resin, urethane resin or phenol resin and a pore forming agent. The use of such a soft binder softens the abrasive wheel holding fixed abrasive grains, thereby absorbing a polishing pressure somewhat. This is effective to reduce occurrence of scratches on the polished surface and hence to enhance surface characteristics, and also to allow the wasted fixed abrasive grains to be easily slipped off and hence to keep the polishing ability for a long period of time. As the pore forming agent, for example, there may be used a water-soluble powder such as starch. A powder of starch is mixed with a binder, and after formation of an abrasive wheel, starch is eluted by washing the wheel, to form pores. The material of the pore forming agent is not limited to a powder of starch and it may be selected from powders soluble in alcohol or an acid in consideration of abrasive grains and a binder.

With respect to the slurry, in the case of using free abrasive grains of $CeO_2$ or the like which have a property being precipitated, the slurry thereof may be prepared by floating the abrasive grains by addition of an additive such as a surface-active agent; or in the case of using abrasive grains of $SiO_2$ or the like, the slurry thereof may be prepared in a colloid state of the abrasive grains of $SiO_2$.

The present invention will be more clearly understood by way of the following example:

A member to be polished, made from $SiO_2$, was continuously polished using two kinds of abrasive wheels and a slurry prepared under the following specifications:

(A) abrasive wheel:
  shape:
    (1) φ200×20 (width)×20 (thickness) (mm)
    (2) φ240×20 (width)×20 (thickness) (mm)
  fixed abrasive grains:
    oxide of rare earth metal (containing $CeO_2$) 93–97% (56–62%)
    Fe 4.0–6.5%
    others 1.0–3.0%
    average particle size: 3.6 μm
  binder:
    (1) thermosetting melamine resin
    (2) urethane resin
(B) slurry
  free abrasive grains: $CeO_2$ purity: 99.5%
  average particle size: 1.6–2.3 μm
  bulk density: 6.5 g
  specific surface area: 1–2 $m^2/g$
  additive: surface-active agent
  mixing volume ratio:
  water: powder of $CeO_2$: additive=2:1:1
  supply rate of mixed solution: 40 mL/min As a result of the experiment performed under the above conditions, in the case of using both the abrasive wheels (1) and (2), a surface roughness Ra of the member to be polished after polishing was 0.654 nm. Accordingly, it was found that a preferable polished surface was obtained. Further, it was confirmed that the flatness of the surface of the member to be polished was significantly improved as compared with polishing using the related art abrasive pad because of a large hardness of the abrasive wheel used in this example.

Figure 5:
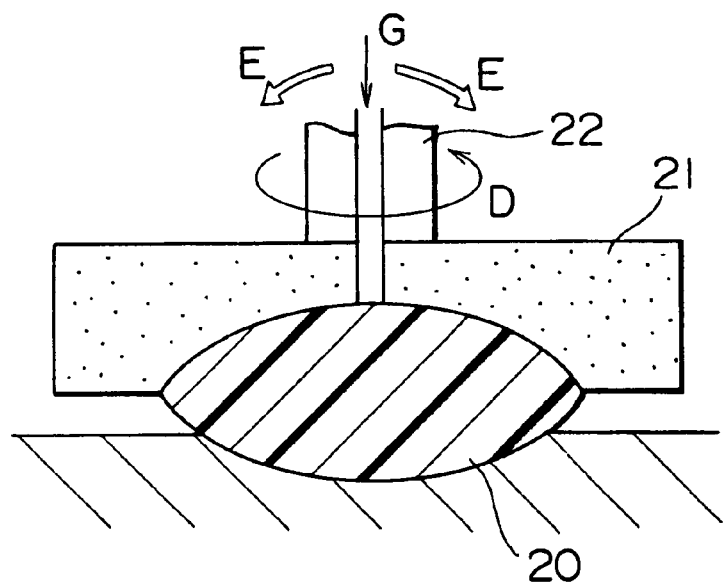
FIG. 5 is a view illustrating a configuration of another embodiment of the present invention.

FIG. 5 is a view illustrating a configuration of another embodiment of the present invention. In this embodiment, the present invention is applied to polishing for a member 20 to be polished which has a curved surface such as an optical lens or a mold part. For example, a surface of the member 20 represented by a convex lens is polished by rotating an abrasive wheel 21 having a polishing surface curved into a concave surface around its axis 22 in the direction shown by an arrow D and rocking it in the direction indicated by an arrow E. In this polishing, as described above, a slurry is supplied in the direction indicated by an arrow G. In this way, since a high transfer characteristic inherent to polishing by fixed abrasive grains and high surface characteristics inherent to polishing by free abrasive grains can be simultaneously satisfied by applying the present invention to polishing for a curved surface, it is possible to finish a curved lens or a mold part having a very preferable surface quality at a high accuracy and a high efficiency.

As a further embodiment of the present invention, two stage polishing may be performed by use of two kinds of abrasive wheels and two kinds of materials of abrasive grains which are changed during polishing. This is effective to obtain a flatness and higher surface characteristics. To be more specific, in the primary polishing, the polished amount is set to be larger for removing steps and irregularities on a polished surface, and in the secondary polishing, the polishing amount is set to be smaller for enhancing surface characteristics. In the primary polishing, there may be used abrasive grains having a hardness and a particle size set to enable relatively highly efficient grinding and an abrasive wheel being hard somewhat, and in the secondary polishing, there may be used abrasive grains having a hardness and a particle size set to suppress occurrence of micro-scratches and an abrasive wheel being relatively soft. In this case, in both the primary polishing and the secondary polishing, there may be adopted the polishing method of the present invention in which polishing by fixed abrasive grains is combined with polishing by free abrasive grains. With the two stage polishing, it is possible to obtain a polished surface with very high flatness and surface characteristics for a short time at a high efficiency and hence to shorten a total tact time of polishing.

While the preferred embodiments of the present invention have been described using specific terms, such description is for illustrative purposes only, and it is to be understood that changes and variations may be made without departing from the spirit or scope of the following claims.

What is claimed is:

1. A polishing method comprising the steps of:
  providing an abrasive wheel having fixed abrasive grains and particles of a pore-forming material being dispersed in a soft binder, said particles of the pore-forming material being eluted when contacted with a solvent,
  polishing a surface of a member to be polished by rotating and sliding the abrasive wheel on the surface while supplying free abrasive grains to the surface of the member to be polished.

2. A polishing method according to claim 1, wherein said soft binder is made from a melamine resin, a urethane resin, or a phenol resin.

3. A polishing method according to claim 1, wherein a ratio of an average particle size of said free abrasive grains to an average particle size of said fixed abrasive grains is in a range of about ⅙ to ⅓.

4. A polishing method according to claim 1, further comprising the step of:
  performing primary polishing for obtaining planarization of a polished surface, and then performing secondary polishing for obtaining surface characteristics of the polished surface by changing one of the kind of said abrasive wheel and the material of said abrasive grains from those used for the primary polishing.

5. A polishing method according to claim 1, wherein the particles of the pore-forming material are starch and the solvent is water, and said step of supplying the free abrasive grains applies the free abrasive grains in a slurry of grains and water.

6. An abrasive material for polishing a surface of a member to be polished, said material comprising abrasive grains and particles of a pore-forming agent being dispersed in a soft binder, said pore-forming agent being eluted when contacted with a solvent to form the pores.

7. An abrasive material according to claim 6, wherein the material has a shape of a wheel with a flat surface for polishing a flat surface.

8. An abrasive material according to claim 6, wherein the abrasive material is an abrasive wheel having a concave surface for polishing convex items.

9. A polishing apparatus comprising an abrasive wheel having abrasive grains and particles of a pore-forming material being dispersed in a soft binder with the abrasive grains being dispersed on the surface, said particles of pore-forming material being eluted when exposed to a solvent to form pores; first means for supporting a member to be polished; second means for rotating the abrasive wheel and moving the wheel relative to a surface of the member to be polished; third means for supplying free abrasive grains in a slurry to the surface of the member being polished; and means for supporting the first, second and third means.

* * * * *